United States Patent
Kimura et al.

(10) Patent No.: US 6,265,850 B1
(45) Date of Patent: Jul. 24, 2001

(54) METHOD AND APPARATUS FOR DETECTING BATTERY ABNORMALITY IN A PARALLEL BATTERY-CONNECTION CIRCUIT

(75) Inventors: Tadao Kimura, Hyogo; Takayuki Hayashi, Shizuoka, both of (JP)

(73) Assignees: Matsushita Electric Industrial Co., Ltd., Kadoma; Toyota Jidosha Kabushiki Kaisha, Aichi-ken, both of (JP)

( * ) Notice: Subject to any disclaimer, the term of this patent is extended or adjusted under 35 U.S.C. 154(b) by 0 days.

(21) Appl. No.: 09/580,340

(22) Filed: May 26, 2000

(30) Foreign Application Priority Data

May 28, 1999 (JP) .................................. 11-150762

(51) Int. Cl.⁷ ...................................................... H02J 7/04
(52) U.S. Cl. .......................................... 320/150; 320/137
(58) Field of Search ................................ 320/150, 137, 320/154, 160, 138

(56) References Cited

U.S. PATENT DOCUMENTS 5,497,068 * 3/1996 Shiojima ............................... 320/150
5,652,500 * 7/1997 Kadouchi et al. .................... 320/150
5,744,936 * 4/1998 Kawakami ............................ 320/120

* cited by examiner

Primary Examiner—Peter S. Wong
Assistant Examiner—Lawrence Luk
(74) Attorney, Agent, or Firm—Renner, Otto, Boisselle & Sklar LLP

(57) ABSTRACT

In a method for detecting abnormality in a parallel battery-connection circuit, the parallel battery-connection circuit includes: a first circuit including a first plurality of batteries connected in series and a second circuit including a second plurality of batteries connected in series; wherein: at least one of the first plurality of batteries is connected to a first temperature detection section, at least one of the second plurality of batteries is connected to a second temperature detection section, and the first temperature detection section and the second temperature detection section are connected to an abnormality determining section for determining abnormality in the parallel battery-connection circuit, the method comprising the steps of: detecting a first temperature of the at least one of the first plurality of batteries by the first temperature detection section; detecting a second temperature of the at least one of the second plurality of batteries by the second temperature detection section; and determining abnormality in the parallel battery-connection circuit by the abnormality determining section based on a temperature difference between the first temperature detected by the first temperature detection section and the second temperature detected by the second temperature detection section.

9 Claims, 3 Drawing Sheets

METHOD AND APPARATUS FOR DETECTING BATTERY ABNORMALITY IN A PARALLEL BATTERY-CONNECTION CIRCUIT

BACKGROUND OF THE INVENTION

1. Field of the Invention

The present invention relates to a method for detecting abnormality in a parallel battery, and more specifically relates to a method for detecting abnormality in a parallel battery-connection circuit.

In this application, a plurality of secondary batteries connected in series is referred to as "a serial circuit," and a circuit in which a plurality of serial circuits are connected in parallel is referred to as "a parallel battery-connection circuit".

2. Description of the Related Art

In one use of secondary batteries, a plurality of secondary batteries are connected in series (serial circuit) so as to provide a high voltage, and a plurality of serial circuits are also connected in parallel so as to provide a high capacity. In order to detect a problem, e.g., an internal short-circuit occurring in such a secondary battery circuit, the following two methods have been proposed.

In one method, the voltage or current value in each serial circuit is monitored so as to compare voltages and current values between the serial circuits and detect a voltage drop or a current value rise caused by abnormality. A serial circuit may be divided into several blocks for a block-by-block complete monitoring. This method is, however, impractical because it requires a complicated apparatus, which may cause a high possibility of defects and dispersion in detected values.

The other method for detecting abnormality utilizes a current value rise of in a serial circuit including a secondary battery with a problem, e.g., overcharging or overdischarging. Specifically, the temperature of a serial circuit rises when the circuit includes a secondary battery with such a problem. Therefore, the abnormality detection in a parallel battery-connection circuit can be controlled based on the absolute value of the temperature values detected from the plurality of serial circuits.

However, the following problem arises if the abnormality detection in a parallel battery-connection circuit is controlled based on the absolute value of the temperature values detected from the plurality of serial circuits.

The temperature values of a plurality of serial circuits are prone to be affected by the environmental temperature outside the parallel battery-connection circuit. If the environmental temperature outside the parallel battery-connection circuit is high, the temperature values of the plurality of serial circuits will also become high.

Therefore, in the case where the environmental temperature outside the circuit is high, the temperature values detected from the serial circuits would rise even if there is no problem of overcharging or overdischarging the secondary batteries of the parallel battery-connection circuit. As a result, such a method of abnormality detection has a risk of resulting in an erroneous determination that an abnormality has been generated even if there is no problem in the parallel battery-connection circuit.

SUMMARY OF THE INVENTION

In the method for detecting abnormality in a parallel battery-connection circuit of this invention, the parallel battery-connection circuit includes: a first circuit including a first plurality of batteries connected in series and a second circuit including a second plurality of batteries connected in series; wherein: at least one of the first plurality of batteries is connected to a first temperature detection section, at lest one of the second plurality of batteries is connected to a second temperature detection section, and the first temperature detection section and the second temperature detection section are connected to an abnormality determining section for determining abnormality in the parallel battery-connection circuit, the method including the steps of: detecting a first temperature of the at least one of the first plurality of batteries by the first temperature detection section; detecting a second temperature of the at least one of the second plurality of batteries by the second temperature detection section; and determining abnormality in the parallel battery-connection circuit by the abnormality determining section based on a temperature difference between the first temperature detected by the first temperature detection section and the second temperature detected by the second temperature detection section.

In one embodiment of the invention, the step for determining abnormality may further include the step of determining that the parallel battery-connection circuit has abnormality when the temperature difference exceeds a certain value.

In another embodiment of the invention, the step for determining abnormality may further include the step of determining, in the case where the temperature difference exceeds the certain value, that there is an abnormal battery in the first circuit if the first temperature is higher than the second temperature, or that there is an abnormal battery in the second circuit if the second temperature is higher than the first temperature.

In still another embodiment of the invention, another one of the first plurality of batteries may be connected to a third temperature detection section, another one of the second plurality of batteries may be connected to a fourth temperature detection section, and the third temperature detection section and the fourth temperature detection section may be connected to the abnormality determining section for determining abnormality in the parallel battery-connection circuit, the method further including the steps of: detecting a third temperature of another one of the first plurality of batteries by the third temperature detection section; detecting a fourth temperature of another one of the second plurality of batteries by the fourth temperature detection section; and determining abnormality in the parallel battery-connection circuit by the abnormality determining section based on a temperature difference between the third temperature detected by the third temperature detection section and the fourth temperature detected by the fourth temperature detection section.

In another aspect of the invention, an abnormality detection apparatus for a parallel battery-connection circuit is connected to the parallel battery-connection circuit including: a first circuit including a plurality of first batteries connected in series; and a second circuit including a plurality of second batteries connected in series, the abnormality detection apparatus including: a first temperature detection section connected to at least one battery of the first circuit; a second temperature detection section connected to at least one battery of the second circuit; and an abnormality determining section connected to the first temperature detection section and the second temperature detection section, the abnormality determining section determining abnormality of the parallel battery-connection circuit, based on the temperature difference between the first temperature detected by the first temperature detection section and the second temperature detected by the second temperature detection section.

In one embodiment of the invention, the abnormality determining section may determine that the parallel battery-connection circuit is abnormal when the temperature difference exceeds a certain value.

In another embodiment of the invention, the abnormality determining section may determine, in the case where the temperature difference exceeds the certain value, that there is an abnormal battery in the first circuit if the first temperature is higher than the second temperature, or that there is an abnormal battery in the second circuit if the second temperature is higher than the first temperature.

In still another embodiment of the invention, at least one of the first plurality of batteries or the second plurality of batteries may include a nickel metal hydride battery.

In still another embodiment of the invention, the abnormality detection apparatus may further include a third temperature detection section connected to another battery of the first circuit and a fourth temperature detection section connected to another battery of the second circuit of the parallel battery-connection circuit.

Thus, the invention described herein makes possible the advantage of providing a method and an apparatus for detecting abnormality, e.g., overcharging and overdischarging in secondary batteries in a parallel battery-connection circuit with certainty, without being affected by the environmental temperature outside the parallel battery-connection circuit.

This and other advantages of the present invention will become apparent to those skilled in the art upon reading and understanding the following detailed description with reference to the accompanying figures.

DESCRIPTION OF THE PREFERRED EMBODIMENTS

Figure 1:
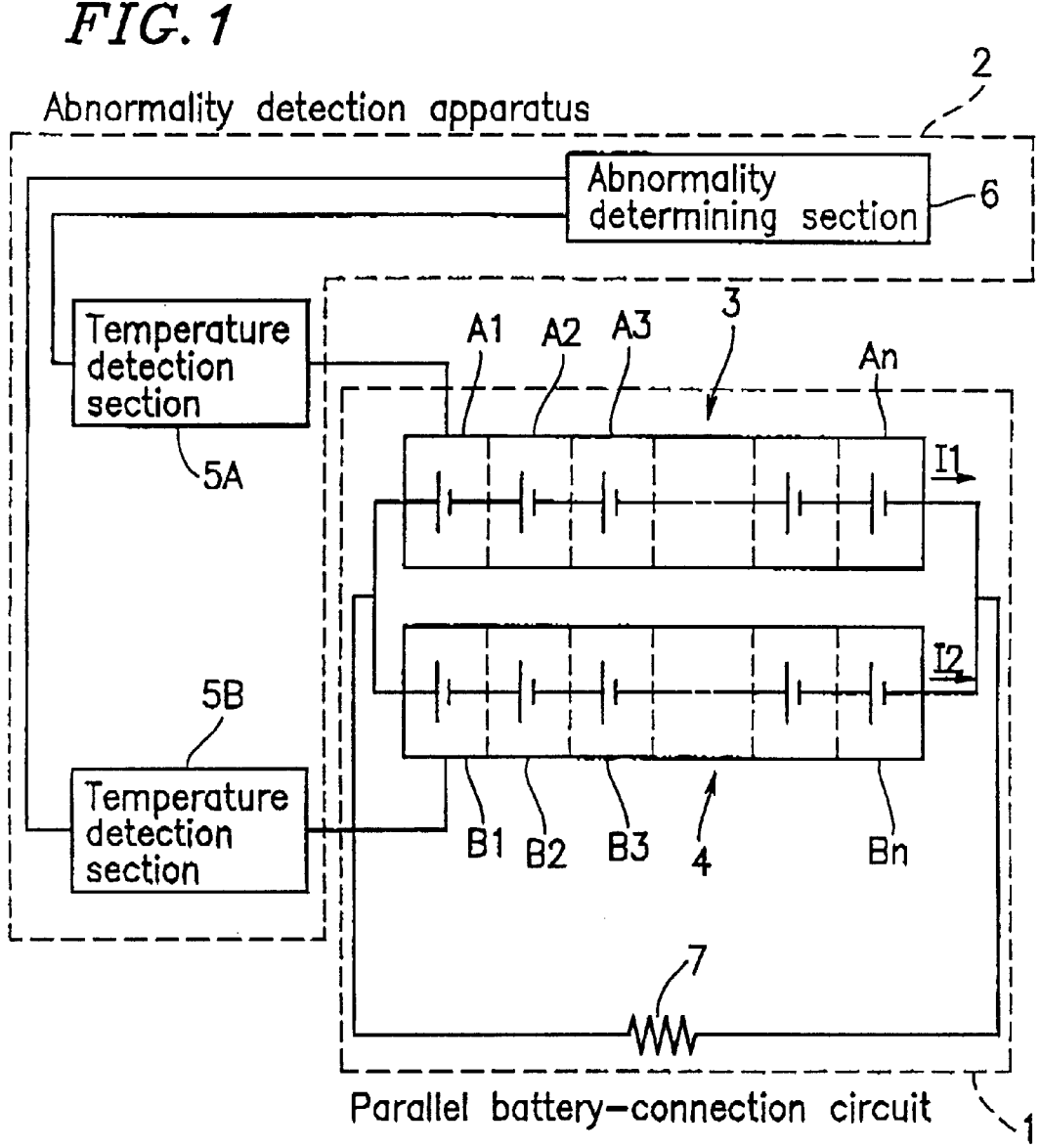
FIG. 1 is a diagram showing a configuration of a parallel battery-connection circuit and an abnormality detection apparatus used for the parallel battery-connection circuit according to the present invention.

FIG. 1 shows a configuration of a parallel battery-connection circuit 1 and an abnormality detection apparatus 2 according to an embodiment of the present invention. The parallel battery-connection circuit 1 includes a first serial circuit 3, a second serial circuit 4 and a resistor 7. The first serial circuit 3 and the second serial circuit 4 are connected in parallel.

The first serial circuit 3 includes a first plurality of batteries A1, A2, A3 . . . An connected in series. The second serial circuit 4 includes a second plurality of batteries B1, B2, B3 . . . Bn connected in series.

The abnormality detection apparatus 2 includes a temperature detection section 5A connected to the battery A1 of the first plurality of batteries, a temperature detection section 5B connected to the battery B1 of the second plurality of batteries, and an abnormality determining section 6 connected to the temperature detection section 5A and the temperature detection section 5B.

Now, the safety control for the parallel battery-connection circuit 1 will be explained.

When the first plurality of batteries A1, A2, A3 . . . An and the second plurality of batteries B1, B2, B3 . . . Bn are connected in series, and these serial circuits (the first serial circuit 3 and the second serial circuit 4) are connected in parallel, if the properties of these batteries do not vary, both the electromotive forces and the resistance values are equal in the first serial circuit 3 and the second serial circuit 4. Therefore, when the first plurality of batteries A1, A2, A3 . . . An and the second plurality of batteries B1, B2, B3 . . . Bn are charged or discharged, the value of a current I1 flowing in the first serial circuit 3 and the value of a current I2 flowing in the second serial circuit 4 become equal.

Even if there is a difference between the charge level of the first serial circuit 3 and the charge level of the second serial circuit 4, the current would flow in the first serial circuit 3 and the second serial circuit 4 so that the voltage of the first serial circuit 3 and the voltage of the second serial circuit 4 become equal. Therefore, after repeated charges and discharges, the charge level of the first serial circuit 3 and the charge level of the second serial circuit 4 converge to a relatively equal level.

As described above, the charge level of the parallel battery-connection circuit 1 as a whole converges to a constant level, and thus a partial overcharging or partial overdischarging does not basically occur in the parallel battery-connection circuit 1.

If one of the batteries among the first plurality of batteries A1, A2, A3 . . . An or the second plurality of batteries B1, B2, B3 . . . Bn connected in series is internally short-circuited, the voltage of the serial circuit including the internally short-circuited battery drops lower by the level of one battery than the voltage of the serial circuit including only normal batteries without a short-circuit. For example, if the first serial circuit 3 includes an internally short-circuited battery, the voltage of the first serial circuit 3 drops lower by the one battery level in comparison to the voltage of the second serial circuit 4. On the other hand, if the second serial circuit 4 includes an internally short-circuited battery, the voltage of the second serial circuit 4 drops lower by the one battery level in comparison to the voltage of the first serial circuit 3. In either case, a voltage difference is created between the first serial circuit 3 and the second serial circuit 4.

In order to compensate for this voltage difference, a current flows from the serial circuit including only normal batteries without a short-circuit to the serial circuit including the internally short-circuited battery. For example, if the first serial circuit 3 includes an internally short-circuited battery, a current flows from the second serial circuit 4 to the first serial circuit 3. On the other hand, if the second serial circuit 4 includes an internal short-circuited battery, a current flows from the first serial circuit 3 to the second serial circuit 4.

Therefore, the normal batteries without a short-circuit in the serial circuit including the internally short-circuited battery turn into a highly charged state. Repeated charges and discharges further advance this highly charged state.

As a result, in the serial circuit including the internally short-circuited battery, the normal batteries may be overcharged when they are charged. This may accelerate the degradation of the batteries, and in a certain type of batteries, an abnormal overheating of the battery even poses a fire danger or hazard.

The present embodiment provides a safety control for the case where such a battery abnormality is generated.

As described above, if a battery abnormality (a short-circuited battery) occurs in a parallel battery-connection circuit 1, the normal batteries in the serial circuit including the short-circuited battery will become overcharged.

In an overcharged state, the battery temperature generally rises because the charging efficiency decreases and thus uncharged energy turns into heat. Therefore, the normal batteries in the serial circuit including the short-circuited battery in a highly charged state reach an overcharged state faster than the normal batteries in the circuit without short-circuited battery do.

This means that by monitoring the battery temperatures of the first serial circuit 3 and the second serial circuit 4, the temperature difference created by the temperature increase due to the overcharging is detectable, whereby the presence of an abnormal battery is detectable.

Figure 2:
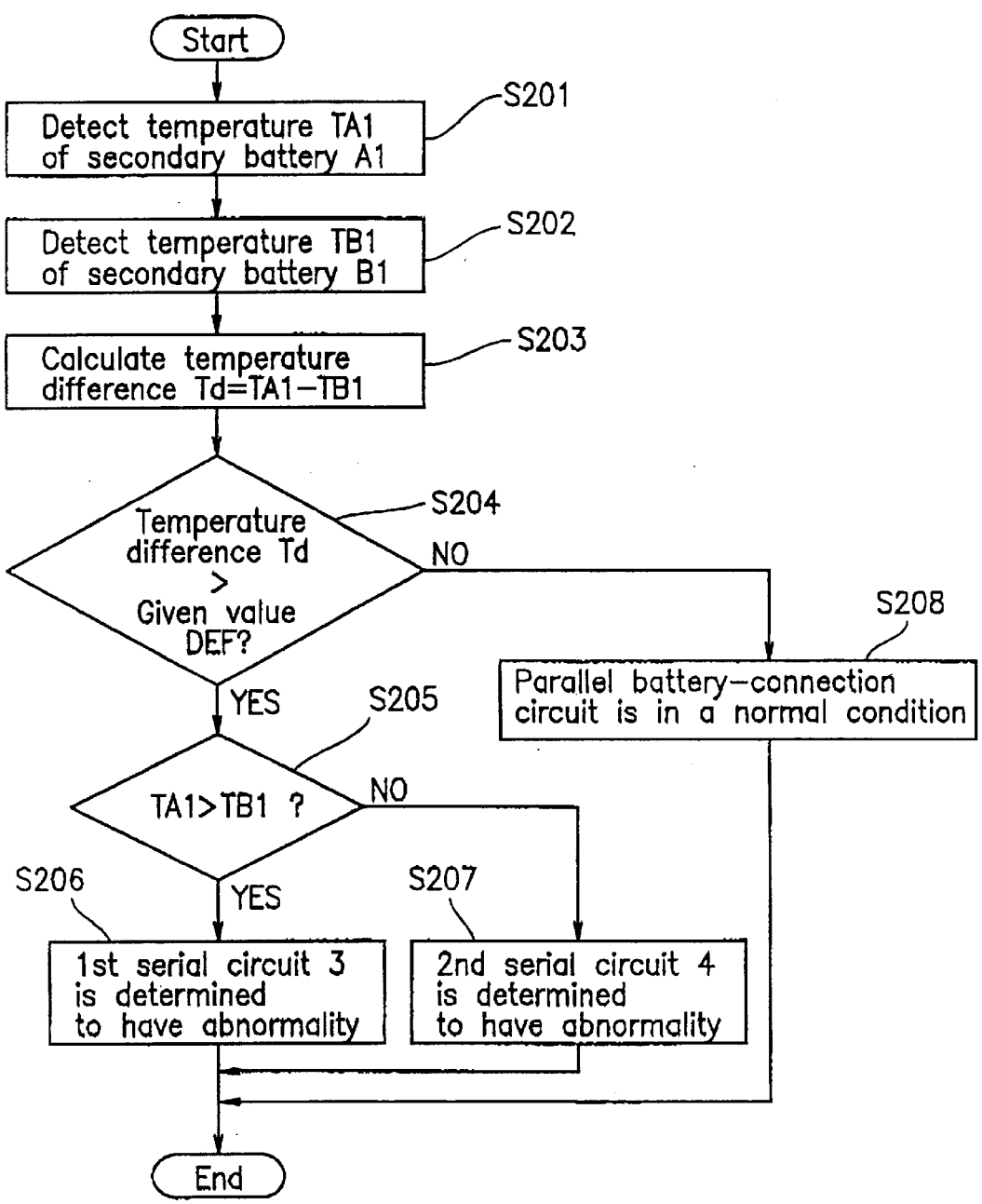
FIG. 2 is a flowchart showing a method for detecting abnormality in the parallel battery-connection circuit according to the present invention.

FIG. 2 is a flowchart showing the steps of an abnormality detection method for the parallel battery-connection circuit 1. With reference to FIGS. 1 and 2, the abnormality detection method will be explained.

The temperature detection section 5A detects a temperature TA1 of the secondary battery A1 (S201). The temperature detection section 5B detects a temperature TB1 of the secondary battery B1 (S202).

Based on the temperature TA1 and the temperature TB1, an abnormality determining section 6 calculates a temperature difference Td between the temperature TA1 and the temperature TB1 (S203).

The abnormality determining section 6 determines whether the temperature difference Td is higher than a given value DEF (S204). If the temperature difference Td is determined to be higher than the given value DEF, the abnormality determining section 6 determines whether or not the temperature TA1 is higher than the temperature TB1 (S205).

If the temperature TA1 of the secondary battery A1 is determined to be higher than the temperature TB1 of the secondary battery B1, the abnormality determining section 6 determines that there is an abnormal battery in the first serial circuit 3 including the secondary battery A1 (S206). If the temperature TA1 of the secondary battery A1 is not higher than the temperature TB1 of the secondary battery B1, the abnormally determining section 6 determines that there is an abnormal battery in the second serial circuit 4 including the secondary battery B1 (S207).

If the temperature difference Td is determined not to be higher than the given value DEF, the abnormality determining section 6 determines that the parallel battery-connection circuit 1 is in a normal condition (S208).

The abnormality detection process completes if it is determined that either there is an abnormal battery in the first serial circuit 3 including the secondary battery A1 (S206), or there is an abnormal battery in the second serial circuit 4 including the secondary battery B1 (S207), or the parallel battery-connection circuit 1 is in a normal condition (S208).

In the present embodiment, the abnormality detection apparatus 2 includes, only one temperature detection section 5A for the first serial circuit 3 and only one temperature detection section 5B for the second serial circuit 4, but the present invention is not limited to such a structure.

Figure 3:
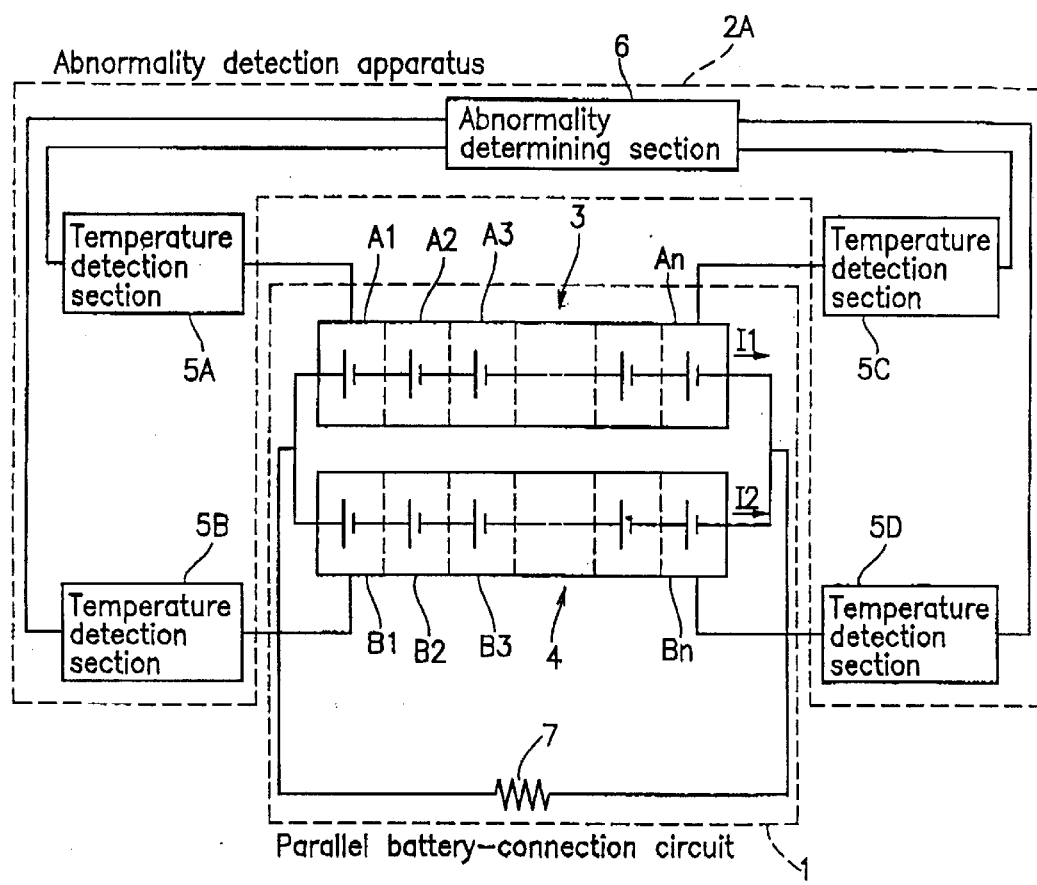
FIG. 3 is a diagram showing the configuration of a parallel battery-connection circuit and another abnormality detection apparatus for the parallel battery-connection circuit according to the present invention.

As shown in FIG. 3, an abnormality detection apparatus 2A may include two temperature detection sections 5A and 5C connected to the first serial circuit 3, and two temperature detection sections 5B and 5D connected to the second serial circuit 4. The abnormality determining section 6 calculates the temperature difference between the temperature TA1 of the secondary battery A1 and the temperature TB1 of the secondary battery B1, and calculates a temperature difference Tdn between a temperature TAn of the secondary battery An and a temperature TBn of the secondary battery Bn. When determining either the temperature difference Td1 or the temperature difference Tdn is higher than the given value DEF, the abnormality determining section 6 determines that there is an abnormal battery in the parallel battery-connection circuit 1. In the structure having two temperature detection sections 5A and 5C for the first serial circuit 3, and two temperature detection sections 5B and 5D for the second serial circuit 4, the reliability of the abnormally detection improves. Also, more than two temperature detection sections may be provided for each circuit.

When the abnormality determining section 6 determines that there is an abnormal battery in the first serial circuit 3 or the second serial circuit 4, the use of batteries in the parallel battery-connection circuit 1 may be suppressed so that the temperature difference Td remains the given value DEF or lower. If the use of batteries in the parallel battery-connection circuit 1 is suppressed so that the temperature difference Td remains the given value DEF or lower, the batteries included in the parallel battery-connection circuit 1 can be used to the maximum limit even if an abnormality occurs in the parallel battery-connection circuit 1.

As described above, according to the present embodiment, the presence of abnormal batteries is detected based on the temperature difference Td between the battery temperature TA1 of the first serial circuit 3 and the battery temperature TB1 of the second serial circuit 4. Thus, abnormalities, e.g., overcharging and overdischarging are detectable with certainty in the secondary batteries in the parallel battery-connection circuit 1 without being affected by the environmental temperature outside the parallel battery-connection circuit 1.

The abnormality detection method for a parallel battery-connection circuit according to the present invention is especially effective when it is incorporated in a parallel battery-connection circuit including a sealed nickel metal hydride battery, in which the temperature significantly increases upon overcharging.

As described above, according to the present invention, abnormalities, e.g., overcharging and overdischarging is detectable with certainty in secondary batteries in a parallel battery-connection circuit without being affected by the environmental temperature outside the parallel battery-connection circuit.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for detecting abnormality in a parallel battery-connection circuit, the parallel battery-connection circuit including:

a first circuit including a first plurality of batteries connected in series and a second circuit including a second plurality of batteries connected in series; wherein:

at least one of the first plurality of batteries is connected to a first temperature detection section, at least one of the second plurality of batteries is connected to a second temperature detection section, and the first temperature detection section and the second temperature detection section are connected to an abnormality determining section for determining abnormality in the parallel battery-connection circuit, the method comprising the steps of:

detecting a first temperature of the at least one of the first plurality of batteries by the first temperature detection section;

detecting a second temperature of the at least one of the second plurality of batteries by the second temperature detection section; and determining abnormality in the parallel battery-connection circuit by the abnormality determining section based on a temperature difference between the first temperature detected by the first temperature detection section and the second temperature detected by the second temperature detection section.

2. A method for detecting abnormality in a parallel battery-connection circuit according to claim 1, wherein the step for determining abnormality further comprises the step of determining that the parallel battery-connection circuit has abnormality when the temperature difference exceeds a certain value.

3. A method for detecting abnormality in a parallel battery-connection circuit according to claim 2, wherein the step for determining abnormality further comprises the step of determining, in the case where the temperature difference exceeds the certain value, that there is an abnormal battery in the first circuit if the first temperature is higher than the second temperature, or that there is an abnormal battery in the second circuit if the second temperature is higher than the first temperature.

4. A method for detecting abnormality in a parallel battery-connection circuit according to claim 1, wherein:

another one of the first plurality of batteries is connected to a third temperature detection section, another one of the second plurality of batteries is connected to a fourth temperature detection section, and the third temperature detection section and the fourth temperature detection section are connected to the abnormality determining section for determining abnormality in the parallel battery-connection circuit, the method further comprising the steps of:

detecting a third temperature of another one of the first plurality of batteries by the third temperature detection section;

detecting a fourth temperature of another one of the second plurality of batteries by the fourth temperature detection section; and determining abnormality in the parallel battery-connection circuit by the abnormality determining section based on a temperature difference between the third temperature detected by the third temperature detection section and the fourth temperature detected by the fourth temperature detection section.

5. An abnormality detection apparatus for a parallel battery-connection circuit, the parallel battery-connection circuit including:

a first circuit including a plurality of first batteries connected in series; and a second circuit including a plurality of second batteries connected in series, the abnormality detection apparatus comprising:

a first temperature detection section connected to at least one battery of the first circuit;

a second temperature detection section connected to at least one battery of the second circuit; and an abnormality determining section connected to the first temperature detection section and the second temperature detection section, the abnormality determining section determining abnormality of the parallel battery-connection circuit, based on the temperature difference between the first temperature detected by the first temperature detection section and the second temperature detected by the second temperature detection section.

6. An abnormality detection apparatus according to claim 5, wherein the abnormality determining section determines that the parallel battery-connection circuit is abnormal when the temperature difference exceeds a certain value.

7. An abnormality detection apparatus according to claim 6, wherein the abnormality determining section determines, in the case where the temperature difference exceeds the certain value, that there is an abnormal battery in the first circuit if the first temperature is higher than the second temperature, or that there is an abnormal battery in the second circuit if the second temperature is higher than the first temperature.

8. An abnormality detection apparatus according to claim 5, wherein at least one of the first plurality of batteries or the second plurality of batteries include a nickel metal hydride battery.

9. An abnormality detection apparatus according to claim 5, further comprising a third temperature detection section connected to another battery of the first circuit and a fourth temperature detection section connected to another battery of the second circuit of the parallel battery-connection circuit.

* * * * *